United States Patent
Haltore et al.

(10) Patent No.: US 10,771,318 B1
(45) Date of Patent: Sep. 8, 2020

(54) HIGH AVAILABILITY ON A DISTRIBUTED NETWORKING PLATFORM

(71) Applicant: VMware, Inc., Palo Alto, CA (US)

(72) Inventors: Kiron Haltore, San Jose, CA (US); Srinivas Srikanth Podilla, Bangalore (IN); Vivek Kalyanaraman, San Jose, CA (US)

(73) Assignee: VMWARE, INC, Palo Alto, CA (US)

( * ) Notice: Subject to any disclaimer, the term of this patent is extended or adjusted under 35 U.S.C. 154(b) by 0 days.

(21) Appl. No.: 16/386,108

(22) Filed: Apr. 16, 2019

Related U.S. Application Data

(60) Provisional application No. 62/749,985, filed on Oct. 24, 2018.

(51) Int. Cl.
| | | |
|---|---|---|
| *G06F 15/177* | (2006.01) | |
| *G06F 15/173* | (2006.01) | |
| *H04L 12/24* | (2006.01) | |
| *H04L 29/12* | (2006.01) | |

(52) U.S. Cl.
CPC ...... *H04L 41/0668* (2013.01); *H04L 41/0803* (2013.01); *H04L 61/10* (2013.01)

(58) Field of Classification Search
CPC . H04L 41/0663; H04L 41/0668; H04L 41/08; H04L 41/06; H04L 41/0803; H04L 61/10; H04L 61/15
USPC .......................................................... 709/223
See application file for complete search history.

(56) References Cited

U.S. PATENT DOCUMENTS

| | | |
|---|---|---|
| 6,304,967 B1 | 10/2001 | Braddy |
| 8,204,061 B1 | 6/2012 | Sane et al. |
| 8,213,336 B2 | 7/2012 | Smith et al. |
| 8,352,608 B1 | 1/2013 | Keagy et al. |
| 9,407,692 B2 | 8/2016 | Rajagopalan et al. |

(Continued)

FOREIGN PATENT DOCUMENTS

| | | |
|---|---|---|
| WO | 2014149148 A1 | 9/2014 |
| WO | 2014149149 A1 | 9/2014 |
| WO | 2015080825 A1 | 6/2015 |

OTHER PUBLICATIONS

Juniper, "Address Resolution Protocol," Aug. 2014, Juniper Networks www.juniper.net/documentation/en_US/junose15.1/topics/topic-map/ip-arp.html (Year: 2014).*

(Continued)

*Primary Examiner* — Ruolei Zong
(74) *Attorney, Agent, or Firm* — Adeli LLP

(57) ABSTRACT

Providing high availability in a distributed networking platform includes detecting that an original primary service engine is unavailable, wherein: the original primary service engine and a plurality of secondary service engines are configured to provide one or more network applications associated with a virtual Internet Protocol (VIP) address; the original primary service engine and the plurality of secondary service engines are in active-active configuration mode; and the original primary service engine is configured to respond to Address Resolution Protocol (ARP) requests designating the VIP address. Additionally, providing high availability in a distributed networking platform further includes determining that a controller is unavailable; and configuring a selected secondary service engine as the next primary service engine.

19 Claims, 9 Drawing Sheets

(56) References Cited

U.S. PATENT DOCUMENTS

| | | | |
|---|---|---|---|
| 9,477,500 B2 | 10/2016 | Basavaiah et al. | |
| 9,483,286 B2 | 11/2016 | Basavaiah et al. | |
| 9,571,507 B2 | 2/2017 | Cooper et al. | |
| 10,089,153 B2 | 10/2018 | Rajagopalan et al. | |
| 2003/0097610 A1* | 5/2003 | Hofner | G06F 11/2038 714/10 |
| 2005/0132030 A1* | 6/2005 | Hopen | H04L 67/1017 709/223 |
| 2010/0262650 A1 | 10/2010 | Chauhan et al. | |
| 2010/0293281 A1 | 11/2010 | Tsimelzon et al. | |
| 2011/0235645 A1 | 9/2011 | Sardar et al. | |
| 2011/0271007 A1 | 11/2011 | Wang et al. | |
| 2012/0033672 A1* | 2/2012 | Page | H04L 45/245 370/395.53 |
| 2012/0096269 A1 | 4/2012 | McAlister | |
| 2012/0110185 A1 | 5/2012 | Ganesan et al. | |
| 2012/0117621 A1 | 5/2012 | Kondamuru et al. | |
| 2012/0155266 A1 | 6/2012 | Patel et al. | |
| 2012/0224486 A1 | 9/2012 | Battestilli et al. | |
| 2013/0044764 A1 | 2/2013 | Casado et al. | |
| 2013/0058225 A1 | 3/2013 | Casado et al. | |
| 2013/0060929 A1 | 3/2013 | Koponen et al. | |
| 2013/0086582 A1 | 4/2013 | Cardona et al. | |
| 2013/0185586 A1 | 7/2013 | Vachharajani et al. | |
| 2014/0040551 A1 | 2/2014 | Blainey et al. | |
| 2014/0068608 A1 | 3/2014 | Kulkarni | |
| 2014/0140221 A1 | 5/2014 | Manam et al. | |
| 2014/0188795 A1* | 7/2014 | Alewine | G06F 11/1658 707/615 |
| 2014/0207968 A1 | 7/2014 | Kumar et al. | |
| 2014/0211607 A1* | 7/2014 | Li | H04L 41/0663 370/219 |
| 2014/0280499 A1 | 9/2014 | Basavaiah et al. | |
| 2014/0282526 A1 | 9/2014 | Basavaiah et al. | |
| 2015/0149635 A1 | 5/2015 | Rajagopalan et al. | |
| 2015/0212909 A1* | 7/2015 | Sporel | H04L 61/103 714/4.11 |
| 2016/0381126 A1 | 12/2016 | Basavaiah et al. | |
| 2017/0031725 A1 | 2/2017 | Rajagopalan et al. | |
| 2017/0078150 A1* | 3/2017 | Koganti | H04L 12/4633 |
| 2018/0143885 A1* | 5/2018 | Dong | G06F 11/1482 |
| 2019/0020656 A1* | 1/2019 | Arjun | H04L 69/40 |

OTHER PUBLICATIONS

Non-Published commonly Owned U.S. Appl. No. 16/173,900, filed Oct. 29, 2018, 36 pages, Avi Networks.

* cited by examiner

HIGH AVAILABILITY ON A DISTRIBUTED NETWORKING PLATFORM

CROSS REFERENCE TO OTHER APPLICATIONS

This application claims priority to U.S. Provisional Patent Application No. 62/749,985 entitled HIGH AVAILABILITY ON A DISTRIBUTED NETWORKING PLATFORM filed Oct. 24, 2018 which is incorporated herein by reference for all purposes.

BACKGROUND OF THE INVENTION

Large scale distributed networking systems, such as those used in data centers or large scale enterprise networks, are often designed as high availability (HA) systems to provide redundancy. Some HA systems are configured in an active/passive model, which requires a fully redundant, passive instance as a backup for each primary, active node. Such systems typically require extra hardware and tend to be more costly to build out. Some HA systems are configured in an active/active model, where both the primary and secondary nodes handle traffic under normal conditions, and in the event that the primary node fails, a secondary node takes over the role of the primary node.

Existing distributed networking systems with active-active HA configuration typically require an additional node (e.g., a controller node) to monitor the health of the primary node. In the event that the controller detects that the primary node has failed, the controller will re-configure the secondary node as a new primary node. In practice, however, controllers are often not co-located with the nodes. In the event that the controller has failed or is unable to communicate with the primary and/or secondary nodes, the reconfiguration of the secondary node would not occur, thus preventing the failover from taking place. A more reliable technique for providing active-active HA for a distributed networking system is therefore needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing high availability (HA) functionality to a distributed networking platform is disclosed. In some embodiments, the distributed networking platform includes an original primary service engine and a plurality of secondary service engines which are in active-active configuration. It is detected that the original primary service engine and a controller are unavailable. A selected secondary service engine is configured as the next primary service engine.

Figure 1:
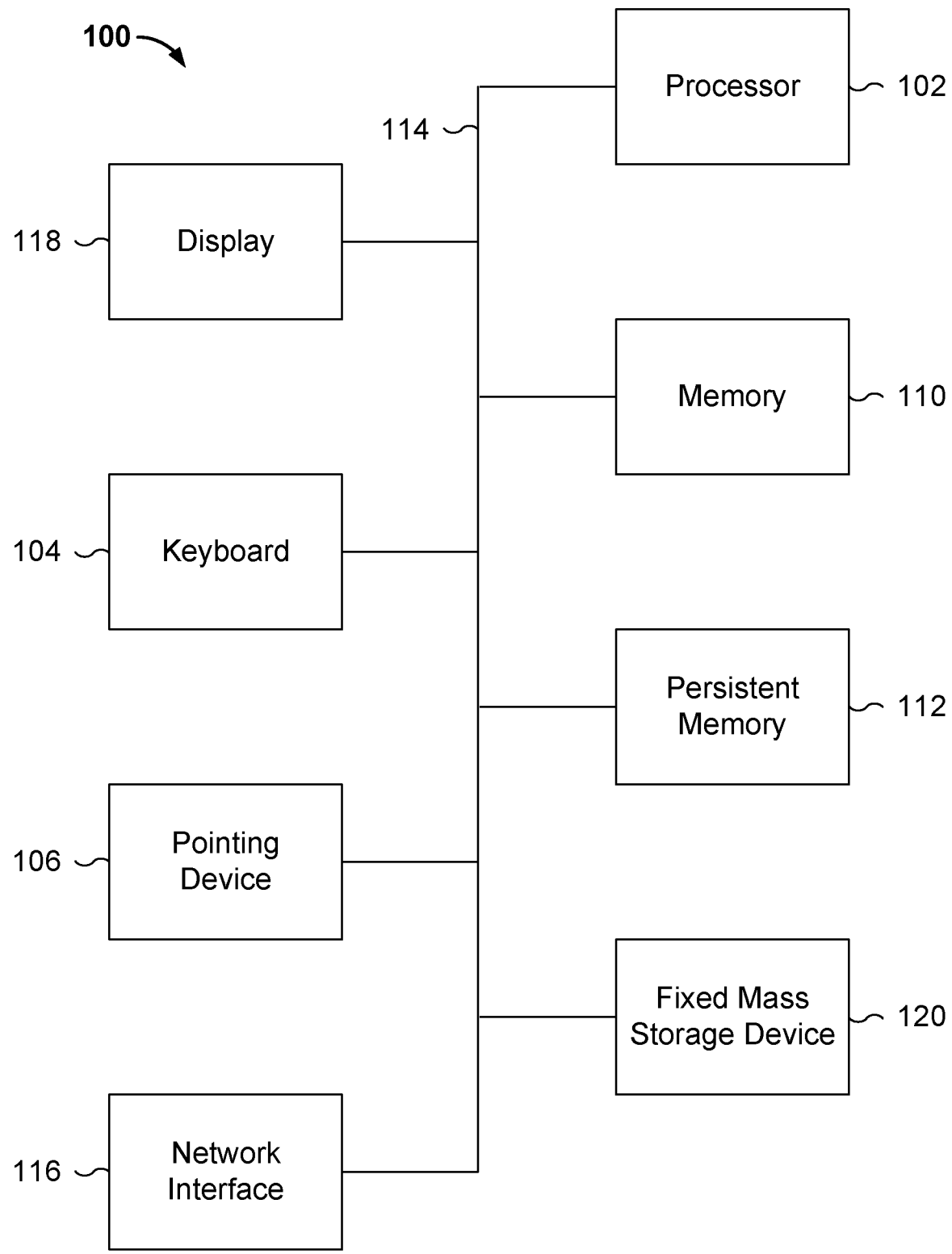
FIG. 1 is a functional diagram illustrating a programmed computer system used to implement an HA system in accordance with some embodiments.

FIG. 1 is a functional diagram illustrating a programmed computer system used to implement an HA system in accordance with some embodiments. As will be apparent, other computer system architectures and configurations can be used to implement HA systems. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
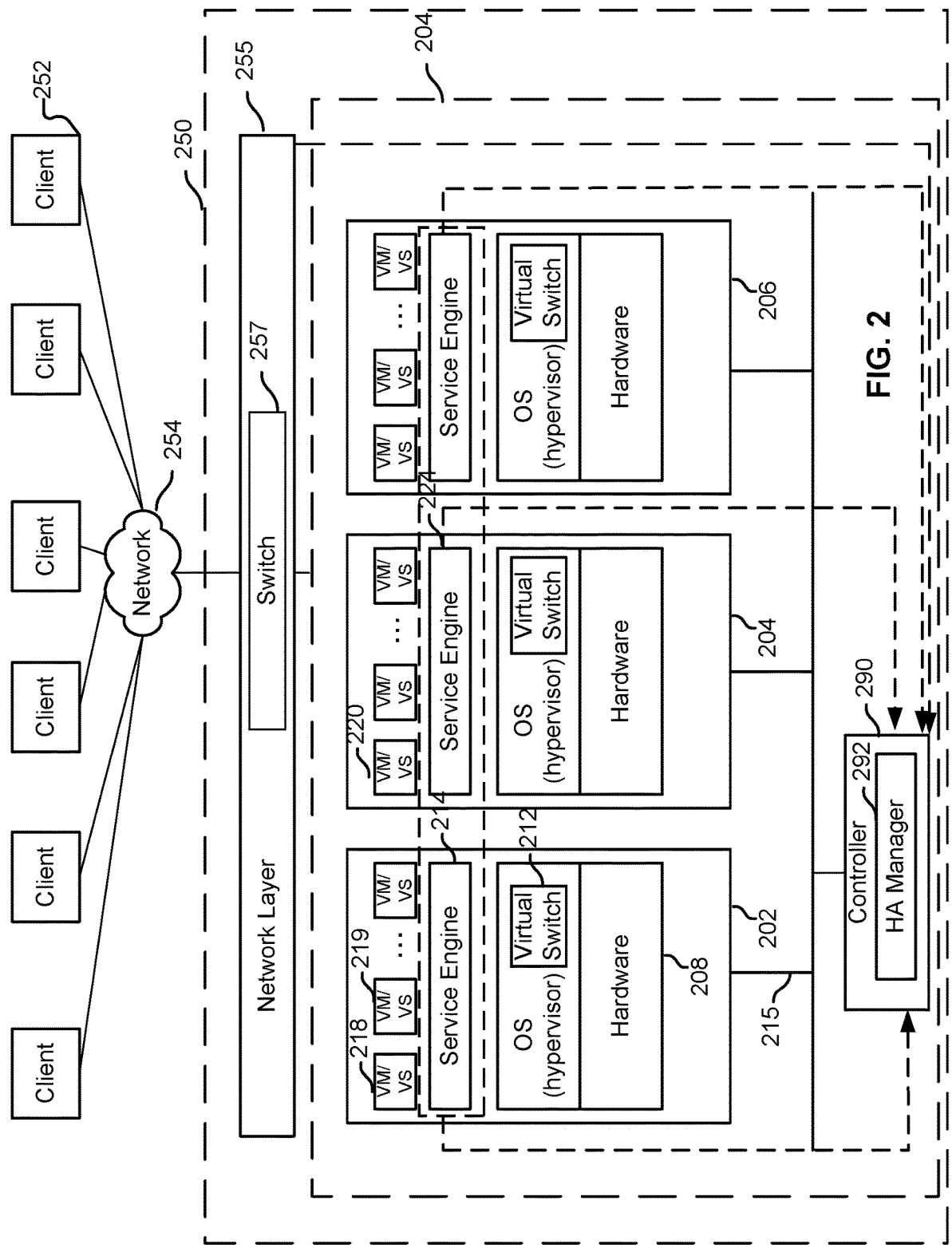
FIG. 2 is a block diagram illustrating an embodiment of a distributed networking platform that includes a distributed networking system with an active-active HA configuration.

FIG. 2 is a block diagram illustrating an embodiment of a distributed networking platform that includes a distributed networking system with an active-active HA configuration.

In this example, client devices such as 252 connect to a data center 250 via a network 254. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain applications hosted by data center 250. Network 254 can be the Internet, a private network, a hybrid network, or any other communications network.

In the example shown, a networking layer 255 comprising networking devices such as routers, switches, etc. forwards requests from client devices 252 to a distributed network service platform 204. In this example, distributed network service platform 204 includes a number of servers configured to provide a distributed network service. A physical server (e.g., 202, 203, 206, etc.) has hardware components and software components, and can be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute on the VMs. In some embodiments, a single application corresponds to a single virtual service. Examples of such virtual services include web applications such as a shopping cart, user authentication, credit card authentication, email, file sharing, virtual desktops, voice/video streaming, online collaboration, and many others. In some embodiments, a set of applications is collectively referred to as a virtual service. For example, a web merchant can offer a shopping cart, user authentication, credit card authentication, product recommendation, and a variety of other applications in a virtual service. Multiple instances of the same virtual service can be instantiated on different devices. For example, the same shopping virtual service can be instantiated on VM 218 and VM 220. The actual distribution of the virtual services depends on system configuration, run-time conditions, etc. Running multiple instances of the virtual service on separate VMs provides better reliability and more efficient use of system resources.

One or more service engines (e.g., 214, 224, etc.) are instantiated on a physical device. In some embodiments, a service engine (SE) is implemented as software executing in a virtual machine. The service engine is configured to provide distributed network services for applications executing on the same physical server as the service engine, and/or for applications executing on different physical servers. In some embodiments, the service engine is configured to enable appropriate network service components (e.g., software modules). For example, a load balancer component is executed to provide load balancing logic to distribute traffic load amongst instances of applications executing on the local physical device as well as other physical devices; a firewall component is executed to provide firewall logic to instances of the applications on various devices; a metrics agent component is executed to gather metrics associated with traffic, performance, etc. associated with the instances of the applications, etc. Many other service components may be implemented and enabled as appropriate. When a specific service is desired, a corresponding service component is configured and invoked by the service engine to execute in a VM. In some embodiments, the service engine also implements a packet processing pipeline that processes packets between the clients and the virtual services.

In the example shown, traffic received on a physical port of a server (e.g., a communications interface such as Ethernet port 215) is sent to a virtual switch (e.g., 212). In some embodiments, the virtual switch is configured to use an API provided by the hypervisor to intercept incoming traffic designated for the application(s) in an inline mode, and send the traffic to an appropriate service engine. In inline mode, packets are forwarded on without being replicated. As shown, the virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server.

A controller 290 is configured to control, monitor, program, and/or provision the distributed network services and virtual machines. In particular, the controller includes an HA manager 292 that monitors the health of the service engines and provides configuration instructions as needed. For example, HA manager 292 is configured to monitor the heartbeats of individual services engines and determine whether the service engines are functioning properly. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

In this example, a virtual service is provided to the client via a Virtual Internet Protocol (VIP) address, which can be specified as an IP address or as a Domain Name System (DNS) domain name. An original primary service engine is selected among the available service engines to respond to Address Resolution Protocol (ARP) requests associated with a particular VIP address. The primary and secondary service engines are in active-active mode, which means that all the service engines may process traffic associated with the VIP. In particular, the secondary service engines actively participate in the processing of incoming traffic, instead of merely standing by normally, and processing traffic only in the event that the primary service engine fails. In some embodiments, the original primary service engine selects a service engine to handle the incoming connection and forwards the traffic to the selected secondary service engine as appropriate, which will then process the request (e.g., firewall, encryption/decryption, etc.), and perform load balancing to select an appropriate server instance to send the request. In some cases, the original primary service engine may choose to handle the request itself. Together, the original primary service engine and the secondary service engines are configured to provide one or more network applications (e.g., load balancing, firewall, encryption, decryption, etc.) associated with the VIP (e.g., the VIP address of 1.2.3.4 or the domain www.example.com, which in turn can be associated with a virtual service such as a web server, a transaction server, etc.).

In this example, the service engines are configured with distinct MAC addresses. The primary service engine associates itself with the VIP by answering any Address Resolution Protocol (ARP) request for the VIP. The primary service engine also has added a VIP-MAC address mapping entry to an ARP table of an upstream networking device such as switch 257 in networking layer 255. In this case, the VIP is the VIP of the virtual service, and the MAC address is the MAC address of the primary service engine. To access a virtual service, the client sends a request for the VIP of the virtual service (or a request for the domain, which would be translated by the DNS into a request for the VIP), and the request is routed to the switch. The switch, which stores an ARP table that maps IP addresses to corresponding MAC addresses, looks up the VIP in the ARP table to find a corresponding MAC address (specifically, the MAC address of the primary service engine). The request is subsequently forwarded to the primary service engine. The primary service engine will perform load balancing. It can provide one or more network applications such as firewall, decryption, etc., to the request, or forward the request to one of the secondary service engines, which will provide the one or more network applications. From the service engine, the request is forwarded to an appropriate instance of the virtual service.

In existing systems that support HA, the controller selects the primary and secondary service engines. In the event that the primary service engine fails, the controller will select a new primary service engine among the secondary service engines. In practice, however, the controller may not be available due to network outage, controller overloading, etc., and therefore may be unable to reassign a new primary service engine. The technique described below allows a new primary service engine to be selected even when the controller is unavailable, and ensures high availability of the system regardless of the condition of the controller.

Figure 3:
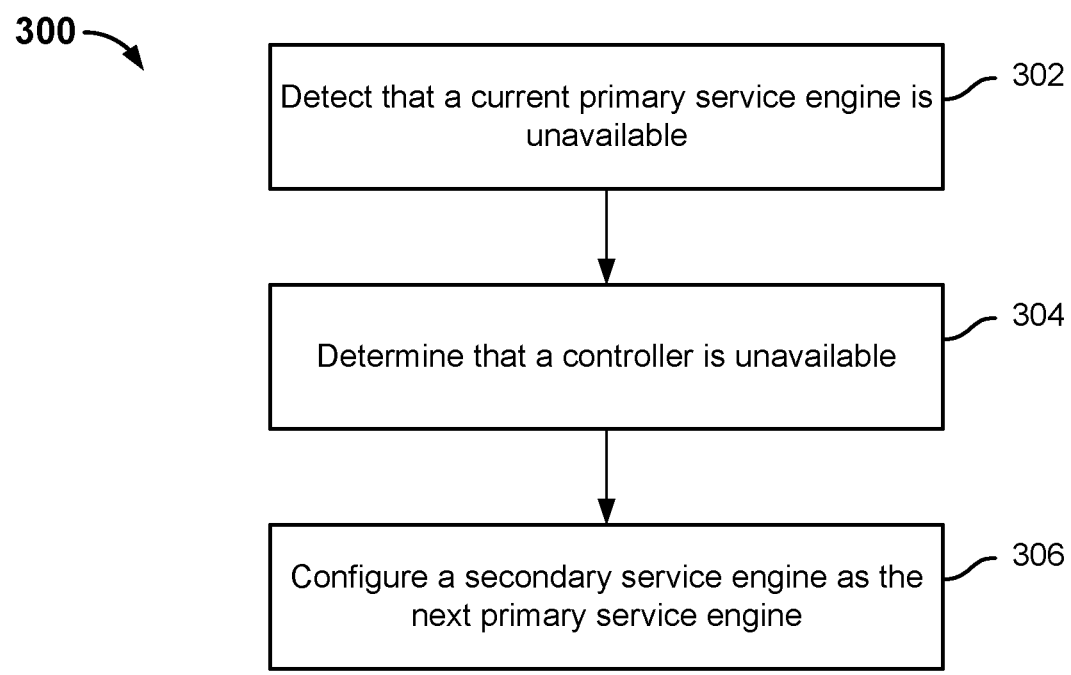
FIG. 3 is a flowchart illustrating an embodiment of a failover process for handling failover and providing high availability.

FIG. 3 is a flowchart illustrating an embodiment of a failover process for handling failover and providing high availability. Process 300 can be performed by a distributed network service platform such as 204. Prior to the failover, the original primary service engine and one or more secondary service engines are configured to provide a network service to a virtual service associated with a VIP.

At 302, it is detected that a current primary service engine is unavailable. The detection can be performed by one or more secondary service engines.

In some embodiments, the primary service engine sends out a heartbeat message at predetermined intervals. Secondary service engines monitor the heartbeat message and check for a pre-specified primary service engine unavailability condition that, if met, indicates that the current primary service engine is deemed to be unavailable. The unavailability can be caused by a failure of the current primary service engine itself (e.g., the primary service engine has crashed and therefore is not sending out heartbeat messages) or the network (e.g., a networking failure prevents the heartbeat messages from reaching other service engines). In some embodiments, the condition specifies that the current primary service engine is deemed to be unavailable if no heartbeat is received after a pre-specified amount of time; in some embodiments, each heartbeat includes a sequence number, and the condition specifies that the current primary service engine is deemed to be unavailable if a given number of consecutive heartbeats are lost. Other unavailability conditions can be used in other embodiments. In the event that the pre-specified primary service engine unavailability condition is met, the current primary service engine is deemed to be unavailable.

At 304, it is determined that a controller that is configured to control the operations of the current primary service engine and the plurality of secondary service engines is unavailable. This is because if the controller were available, it could select a secondary service engine to replace the current primary service engine. When the controller is unavailable (due to having failed, having lost connection with the other service engines, etc.), the secondary service engines will make a selection of the next primary service engine on their own. In some embodiments, the controller sends out heartbeat messages at predetermined intervals. The secondary service engines monitor the controller's heartbeat message and check for a pre-specified controller unavailability condition that, if met, indicates that the controller is deemed to have failed or become unavailable. The unavailability can be caused by a failure of the controller itself (e.g., the controller has crashed and therefore is not sending out heartbeat messages) or the network (e.g., a networking failure prevents the heartbeat messages from reaching the service engines). In some embodiments, the unavailability condition specifies that the controller is deemed to be unavailable if no heartbeat is received after a pre-specified amount of time; in some embodiments, each heartbeat includes a sequence number, and the condition specifies that the controller is deemed to be unavailable if a given number of consecutive heartbeats are lost. Other unavailability conditions can be used in other embodiments. In the event that the pre-specified controller unavailability condition is met, the controller is deemed to be unavailable. The controller unavailability condition can be the same as or different from the primary service engine unavailability condition.

At 306, a secondary service engine among the plurality of secondary service engines is configured as the next primary service engine. In this example, the plurality of secondary service engines cooperate to select the next primary service engine.

There are many possible techniques for selecting the next primary service engine. In some embodiments, the order in which the service engines are to be selected as primary is specified in an ordered priority list, which is sent to all the service engines at configuration time. The next primary service engine is selected based on the list and the current primary service engine. For example, suppose that the ordered priority list specifies that service engines SE1, SE2, SE3, and SE4 are to be selected as the primary in that order. If the current primary service engine is SE1, then the next primary service engine is SE2. If the current primary service engine is SE2, the next primary service engine can be either SE3 (the next one in the list after the current primary service engine) or SE1 (the highest priority one in the list) depending on implementation.

In some embodiments, the next primary service engine is selected according to an identifying characteristic of the service engines, such as the Media Access Control (MAC) addresses. For example, in some embodiments, the secondary service engine that has the highest MAC address is selected as the next primary service engine. In some embodiments, the secondary service engine that has the lowest MAC address is selected as the next primary service engine. A higher/lower MAC address can be determined by comparing the values of the MAC address fields. The specific selection direction (e.g., whether it is the greatest or the smallest MAC) can vary for different embodiments, as long as it is consistent within a single embodiment.

In some embodiments, the next primary service engine is selected by quorum. Specifically, the same selection function is executed by each secondary service engine, a common state is updated based on the results, and a selection is made based on the common state. For example, the selection function can be an operation that determines the number of active connections on each secondary service engine. A shared file or storage location is updated based on the results (using, for example, Apache ZooKeeper™ service to keep track of the results). The secondary service engine with the least number of active connections is selected as the next primary service engine. Other selection functions can be applied in other embodiments.

Figure 4:
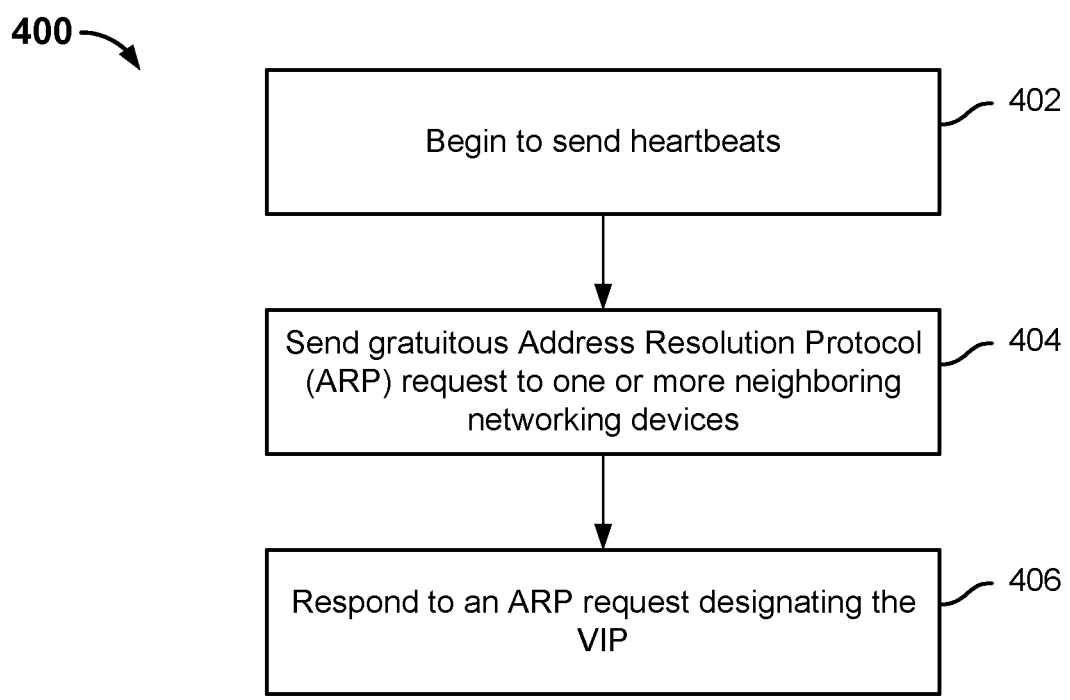
FIG. 4 is a flowchart illustrating an embodiment of a process performed by a secondary service engine that has been selected as the next primary service engine.

FIG. 4 is a flowchart illustrating an embodiment of a process performed by a secondary service engine that has been selected as the next primary service engine.

At 402, the next primary service engine begins to send heartbeats, indicating that it has assumed the role of the primary service engine. The heartbeat messages are sent at the same rate as the previous primary service engine, via a broadcast protocol to other service engines.

At 404, the next primary service engine sends a gratuitous Address Resolution Protocol (ARP) to one or more neighboring networking devices, notifying the neighboring networking devices of the next primary service engine's primary status and updating the IP-MAC address mapping table (also referred to as the ARP table or ARP cache) in the neighboring networking devices. Examples of neighboring networking devices include neighboring switches, routers, etc. on the network that send ARP requests for the VIP. The gratuitous ARP updates the ARP cache before any update request is made by the ARP cache owner. As discussed above in connection with FIG. 2, the networking devices store an ARP table which maps IP addresses to MAC addresses. Prior to the failover, the ARP table includes a mapping of the VIP to the MAC address of the current primary service engine. Any traffic from a client device destined for the VIP will be directed to the current primary service engine. After the failover, the next primary service engine sends the gratuitous ARP request, which the neighboring networking devices receive and use to update their ARP table. Specifically, the VIP is now mapped to the MAC address of the next primary service engine. This way, future traffic from client devices destined for the VIP will be directed to the next service engine.

At 406, the next primary service engine responds to an ARP request designating the VIP. This step does not necessarily need to occur after 404 and can be performed prior to or concurrently with 404. The ARP request may come from any device in the same network as the service engine, including client devices, server devices, routers, etc. In response, the next primary service engine sends an ARP reply, thus notifying the ARP requester of the primary status of the next primary service engine and ensuring that future traffic sent by the requester will be directed to the next primary service engine. The requester maintains an ARP table that keeps track of VIP to MAC address binding, and updates the ARP table based on the ARP response.

Figure 5A:
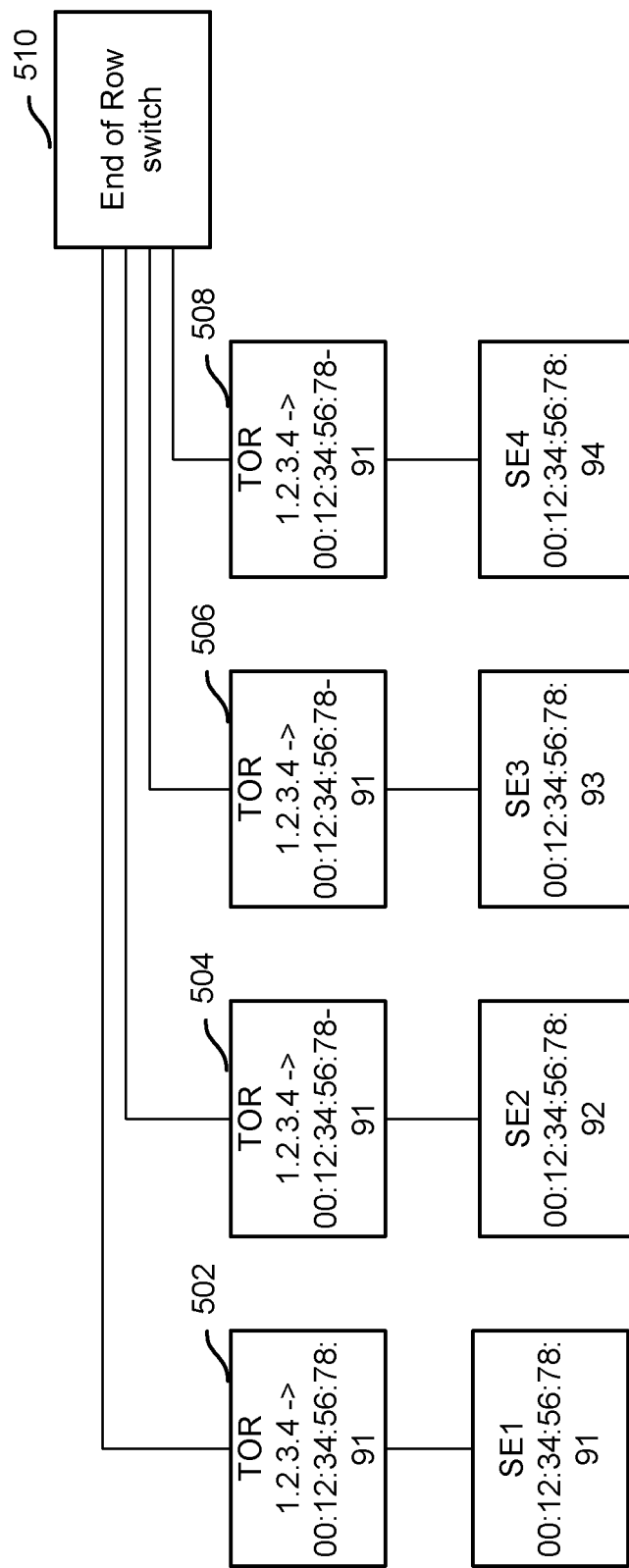
FIGS. 5A-5C are diagrams illustrating an embodiment of a high availability system before and after failovers.
Figure 5B:
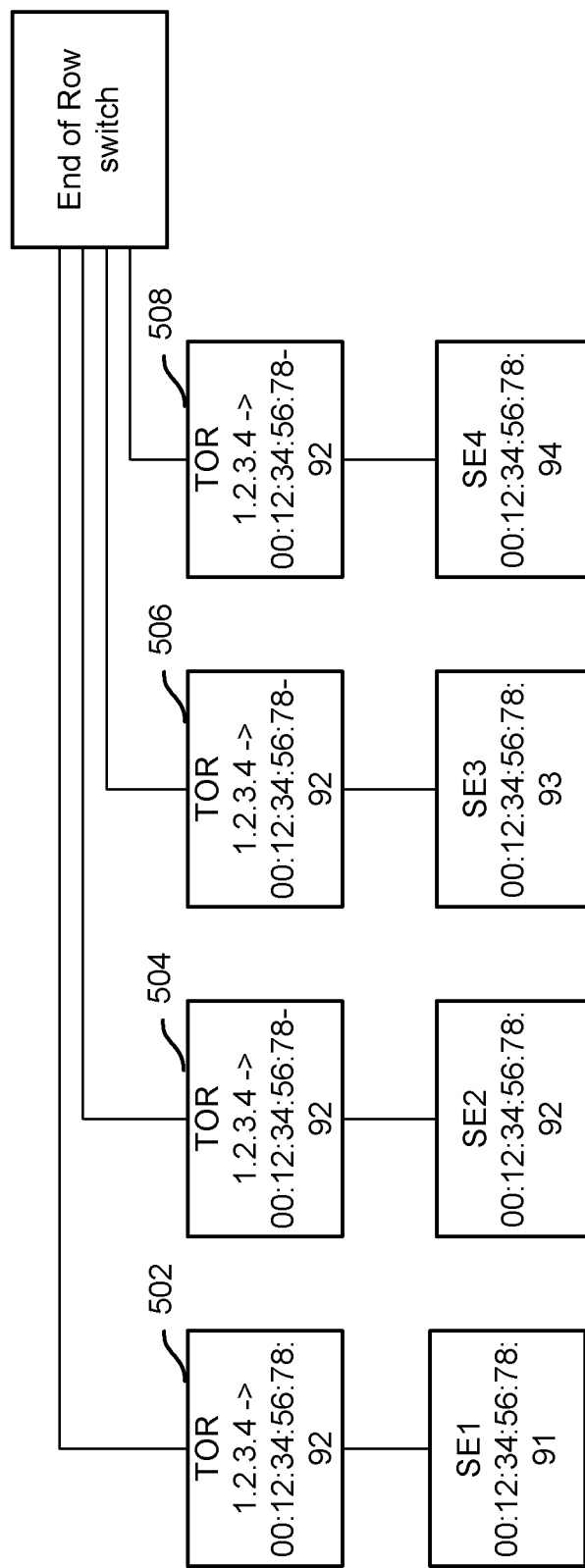
Figure 5C:
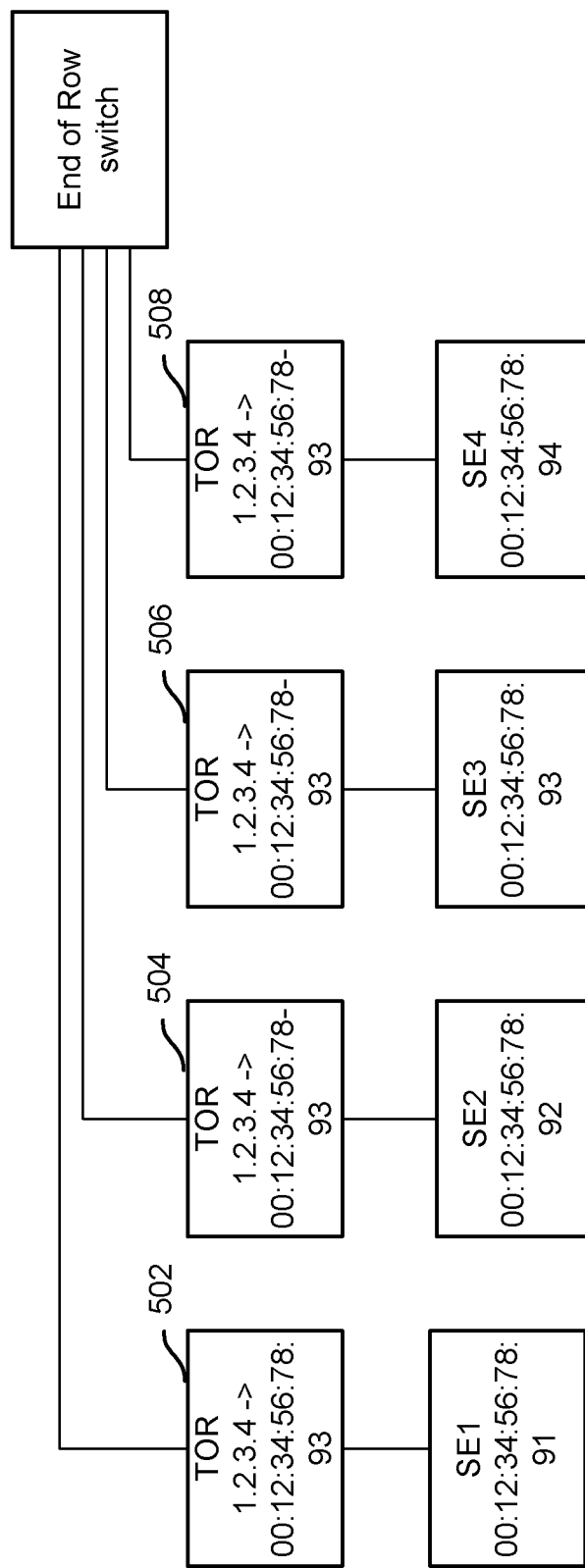

FIGS. 5A-5C are diagrams illustrating an embodiment of a high availability system before and after failovers.

In FIG. 5A, SE1 is the primary service engine configured to provide a network application associated with the VIP of 1.2.3.4. SE1 has a MAC address of 00:12:34:56:78:91. Thus, various neighboring switches of the service engine (including top of rack (TOR) switches 502-508, etc.) each include an ARP table entry mapping VIP 1.2.3.4 to 00:12:34:56:78:91. In some embodiments, end of row (EOR) switch 510 is on the same subnet as the service engine and therefore also includes an ARP table that maps the VIP to the MAC.

If SE1 fails (or if TOR 502 fails and therefore SE1 is disconnected) and no heartbeat from SE1 is detected, a failover occurs and SE2 is selected as the next primary service engine. In FIG. 5B, the ARP table entries of the neighboring switches are updated to map VIP 1.2.3.4 to the MAC address of SE2, which in this case is 00:12:34:56:78:92.

In FIG. 5C, SE2 has failed, and SE3 is selected as the next primary service engine. The ARP table entries of the neighboring switches are updated to map VIP 1.2.3.4 to the MAC address of SE3, which in this case is 00:12:34:56:78:93.

Figure 6:
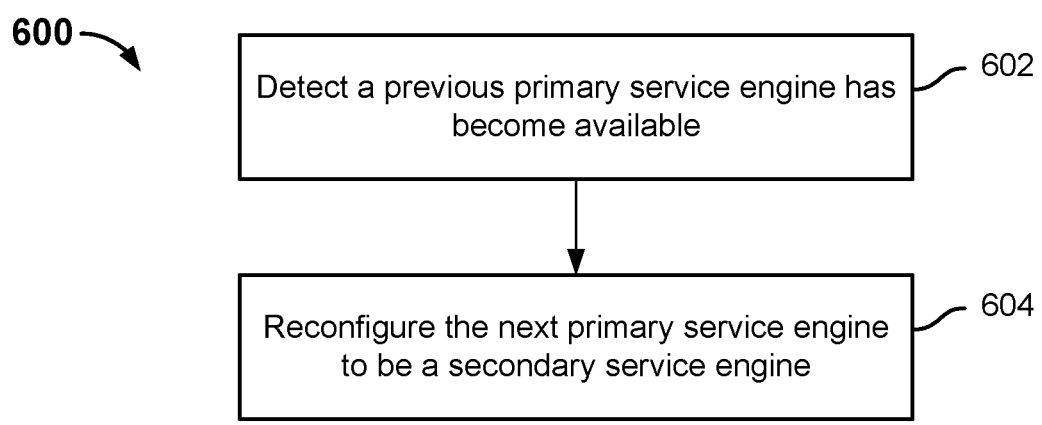
FIG. 6 is a flowchart illustrating an embodiment of a process for on-going monitoring and reconfiguration by the next primary service engine.

In some embodiments, after the next primary service engine has assumed its role, it will continue to monitor the availability of the previous primary service engine or a higher priority service engine. FIG. 6 is a flowchart illustrating an embodiment of a process for on-going monitoring and reconfiguration by the next primary service engine. Process 600 can be performed by a system such as 204.

At 602, the next primary service engine detects that the previous primary service engine (e.g., a higher priority service engine) has become available. The previous primary service engine or the higher priority service engine may become available because it has been restarted, the network connection has been restored, etc., and heartbeats from the previous or higher priority service engine are once again detected.

For example, suppose that the ordered list specifies that service engines SE1, SE2, SE3, and SE4 are to be selected as primary in that order. Suppose that the previous primary service engine was SE2 and therefore the next primary service engine is SE3. SE3 will monitor the heartbeats from the previous, higher priority primary service engines SE1 and SE2. Sometime after SE3 has become the primary, it detects the heartbeats for a previous, higher priority primary service engine SE2 (while SE1 is still not available in this example).

At 604, the next primary service engine SE3 is reconfigured as a secondary service engine. Specifically, the next primary service engine SE3 no longer responds to any new ARP requests associated with the VIP address and stops sending out heartbeat messages.

Meanwhile, service engine SE2 continues to send out heartbeats and answer ARP requests. In the event that SE2 is restarted, it will take over the role of the primary and send out a gratuitous ARP request to the neighboring networking devices in the manner of 404 of process 400, and change the ARP caches from what is shown in FIG. 5C back to what is shown in FIG. 5B. In this example, whenever an SE takes over as the primary, it will send out a gratuitous ARP.

Figure 7:
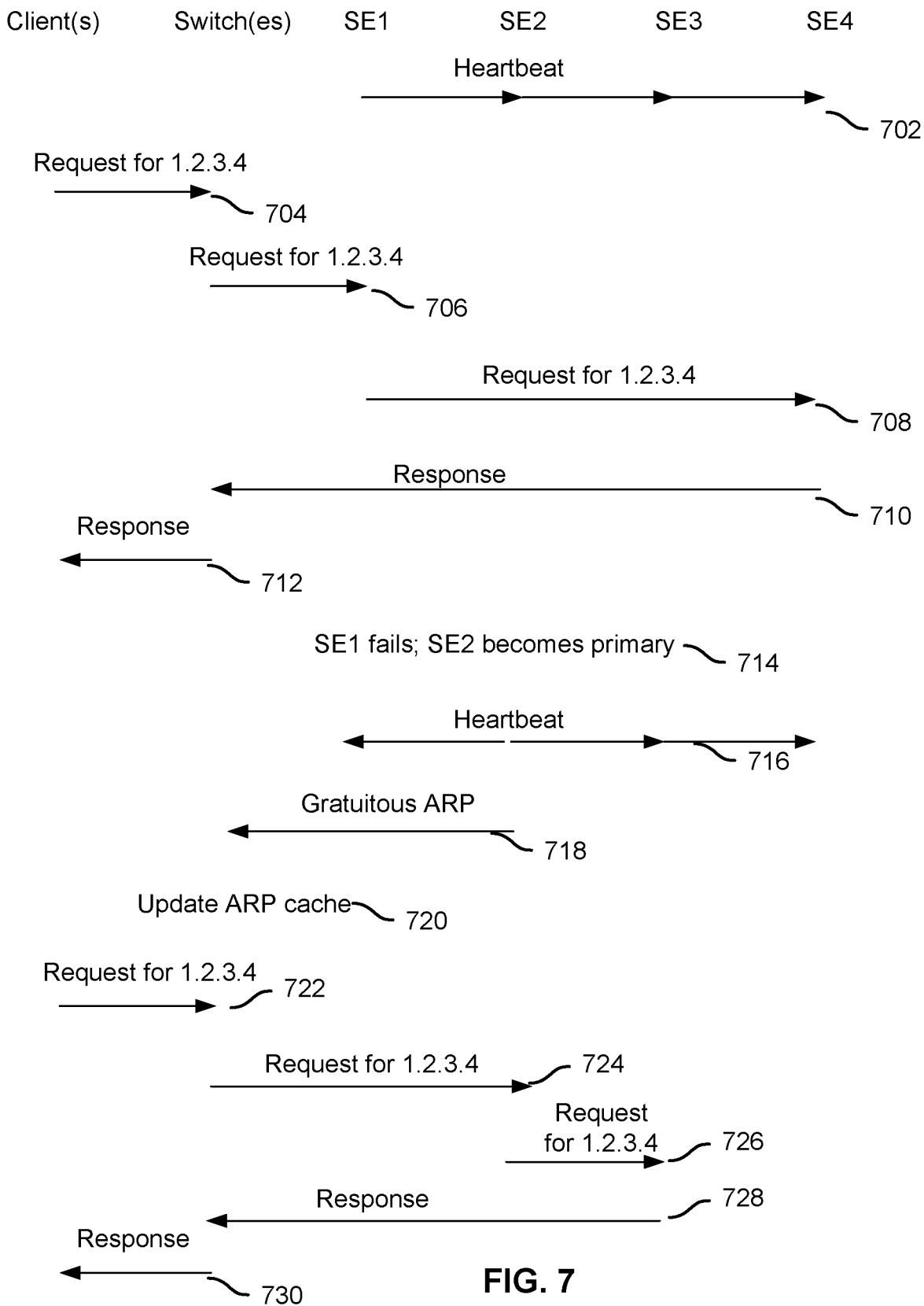
FIG. 7 is an embodiment of a sequence diagram illustrating the events and messages associated with an example HA system before, during, and after a failover.

FIG. 7 is an embodiment of a sequence diagram illustrating the events and messages associated with an example HA system before, during, and after a failover.

At 702, service engine SE1, which is the current primary service engine, sends out heartbeats to the other service engines on the network.

At 704, a HTTP request for a virtual service associated with the VIP of 1.2.3.4 is sent by client 1 and received by a switch (e.g., a TOR switch). Presently, the ARP table of the switch maintains an entry that maps VIP 1.2.3.4 to SE1's MAC address (00:12:34:56:78:91).

At 706, the HTTP request is forwarded by the switch to SE1 according to the mapping in the ARP table.

At 708, SE1 performs load balancing and redistributes the HTTP request to SE4.

At 710, SE4 responds to the HTTP request and sends the response back to the client via the neighboring switch (which can be a TOR switches 502-508).

At 712, the switch forwards the response to the client.

At 714, heartbeats from SE1 are no longer received by the other service engines, and SE1 is deemed to have failed. A failover happens, and SE2 becomes the next primary service engine according to the selection scheme.

At 716, SE2 starts to send heartbeats to the other service engines.

At 718, a gratuitous ARP is sent by SE2 to the switch.

At 720, the switch updates the ARP table and replaces the mapping of the VIP to the MAC address of SE2 (00:12:34:56:78:92).

At 722, another HTTP request for the virtual service associated with VIP 1.2.3.4 is sent by another client and received by the switch.

At 724, the request is forwarded by the switch to the MAC address that corresponds to the VIP, in this case SE2's MAC address.

The primary service engine, SE2, will either handle the request locally or forward it to a secondary service engine. In this case, at 726, SE2 forwards the request to SE3.

At 728, the response from SE3 is sent to the switch.

At 730, the switch forwards the response to the client.

A distributed networking platform with active-active HA configuration has been disclosed. The improved platform allows secondary service engines to detect primary service engine failure and select among themselves a next primary service engine. The technique allows a next primary service engine to be selected even if the controller is unavailable, and therefore reduces reliance on the controller and improves overall system availability.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
 detecting that an original primary service engine is unavailable, wherein:
  the original primary service engine and a plurality of secondary service engines are configured to provide one or more network applications associated with a virtual Internet Protocol (VIP) address;
  the original primary service engine and the plurality of secondary service engines are in active-active configuration mode; and
  the original primary service engine is configured to respond to Address Resolution Protocol (ARP) requests designating the VIP address;
 determining that a controller is unavailable; and
 configuring a selected secondary service engine as a next primary service engine.

2. The method of claim 1, further comprising:
 receiving, at the next primary service engine, traffic associated with the VIP address; and
 forwarding, by the next primary service engine, the traffic associated with the VIP address to another secondary service engine among the plurality of secondary service engines.

3. The method of claim 1, wherein the selected secondary service engine is selected according to an ordered priority list.

4. The method of claim 1, wherein the selected secondary service engine is selected according to an identifying characteristic.

5. The method of claim 1, wherein configuring the selected secondary service engine as the next primary service engine includes sending, by the selected secondary service engine, heartbeats indicating that the selected secondary service engine has become the next primary service engine.

6. The method of claim 1, wherein configuring the selected secondary service engine as the next primary service engine includes sending, by the selected secondary service engine, to a neighboring networking device a gratuitous Address Resolution Protocol (ARP) to update an ARP cache.

7. The method of claim 1, wherein configuring the selected secondary service engine as the next primary service engine includes responding, by the selected secondary service engine, to an ARP request designating the VIP address.

8. The method of claim 1, further comprising:
 determining that a previous primary service engine has become available; and
 reconfiguring the next primary service engine to be a secondary service engine.

9. The method of claim 1, further comprising:
 determining that a previous primary service engine has become available; and
 reconfiguring the next primary service engine to be a secondary service engine, including:
  stopping responding to any new ARP requests associated with the VIP address; and
  sending a gratuitous ARP with an empty MAC address to a neighboring networking device.

10. A system comprising:
 one or more processors configured to:
  detect that an original primary service engine is unavailable, wherein:
   the original primary service engine and a plurality of secondary service engines are configured to provide one or more network applications associated with a virtual Internet Protocol (VIP) address;
   the original primary service engine and the plurality of secondary service engines are in active-active configuration mode; and
   the original primary service engine is configured to respond to Address Resolution Protocol (ARP) requests designating the VIP address;
  determine that a controller is unavailable; and
  configure a selected secondary service engine as a next primary service engine; and
 one or more memories coupled to the one or more processors and configured to provide the one or more processors with instructions.

11. The system of claim 10, wherein the one or more processors are further configured to:
 receive, at the next primary service engine, traffic associated with the VIP address; and
 forward, by the next primary service engine, the traffic associated with the VIP address to another secondary service engine among the plurality of secondary service engines.

12. The system of claim 10, wherein the selected secondary service engine is selected according to an ordered priority list.

13. The system of claim 10, wherein the selected secondary service engine is selected according to an identifying characteristic.

14. The system of claim 10, wherein to configure the selected secondary service engine as the next primary service engine includes to send, by the selected secondary service engine, heartbeats indicating that the selected secondary service engine has become the next primary service engine.

15. The system of claim 10, wherein to configure the selected secondary service engine as the next primary service engine includes to send, by the selected secondary service engine, to a neighboring networking device a gratuitous Address Resolution Protocol (ARP) to update an ARP cache.

16. The system of claim 10, wherein to configure the selected secondary service engine as the next primary service engine includes to respond, by the selected secondary service engine, to an ARP request designating the VIP address.

17. The system of claim 10, wherein the one or more processors are further configured to:
 determine that a previous primary service engine has become available; and
 reconfigure the next primary service engine to be a secondary service engine.

18. The system of claim 10, wherein the one or more processors are further configured to:

determine that a previous primary service engine has become available; and reconfigure the next primary service engine to be a secondary service engine, including to:
- stop responding to any new ARP requests associated with the VIP address; and
- send a gratuitous ARP with an empty MAC address to a neighboring networking device.

19. A computer program product, the computer program product being embodied in a tangible non-transitory computer readable storage medium and comprising computer instructions for:

detecting that an original primary service engine is unavailable, wherein:
- the original primary service engine and a plurality of secondary service engines are configured to provide one or more network applications associated with a virtual Internet Protocol (VIP) address;
- the original primary service engine and the plurality of secondary service engines are in active-active configuration mode; and
- the original primary service engine is configured to respond to Address Resolution Protocol (ARP) requests designating the VIP address;

determining that a controller is unavailable; and configuring a selected secondary service engine as a next primary service engine.

* * * * *

UNITED STATES PATENT AND TRADEMARK OFFICE
CERTIFICATE OF CORRECTION

| | | |
|---|---|---|
| PATENT NO. | : 10,771,318 B1 | Page 1 of 1 |
| APPLICATION NO. | : 16/386108 | |
| DATED | : September 8, 2020 | |
| INVENTOR(S) | : Kiron Haltore, Srinivas Srikanth Podilla and Vivek Kalyanaraman | |

It is certified that error appears in the above-identified patent and that said Letters Patent is hereby corrected as shown below:

On the Title Page

Item (72) The correct inventor's name for "Srinivas Srikanth Podilla" should be "Srinivas Srikanth Podila".

Signed and Sealed this
Twenty-eighth Day of November, 2023

Katherine Kelly Vidal
*Director of the United States Patent and Trademark Office*